July 2, 1968     J. W. McCRARY, JR., ET AL     3,391,016
SILICON CARBIDE COATING ON GRAPHITE BORES OF HEAT EXCHANGER
Original Filed Feb. 7, 1964     2 Sheets-Sheet 1

INVENTORS
JAMES W. McCRARY, JR.,
ROBERT C. POST, III &
BY   JOHN J. AYLWIN

Robert A. Crawford
ATTORNEY

July 2, 1968 J. W. McCRARY, JR., ET AL 3,391,016
SILICON CARBIDE COATING ON GRAPHITE BORES OF HEAT EXCHANGER
Original Filed Feb. 7, 1964 2 Sheets-Sheet 2

INVENTORS
JAMES W. McCRARY, JR.,
ROBERT C. POST, III &
BY JOHN J. AYLWIN

ATTORNEY

United States Patent Office 3,391,016
Patented July 2, 1968

3,391,016
SILICON CARBIDE COATING ON GRAPHITE BORES OF HEAT EXCHANGER
James W. McCrary, Jr., Richardson, and Robert C. Post III, and John J. Aylwin, Dallas, Tex., assignors to Texas Instruments Incorporated, Dallas, Tex., a corporation of Delaware
Original application Feb. 7, 1964, Ser. No. 343,267, now Patent No. 3,250,322, dated May 10, 1966. Divided and this application Oct. 16, 1964, Ser. No. 418,572
2 Claims. (Cl. 117—93.3)

ABSTRACT OF THE DISCLOSURE

Disclosed is a heat exchange element comprised of an annular body of graphite having a plurality of circumferentially spaced, generally radially extending bores and a plurality of circumferentially spaced, axially extending bores coated with an essentially silicon carbide fluid-impervious coat. Disclosed also is a process for applying the silicon carbide coat to the heat exchange element wherein the annular body of graphite is heated and rotated about its longitudinal axis within a reaction chamber, a first stream of hydrogen, silicon and carbon is directed onto the body in a direction substantially perpendicular to the axis of rotation, and the second stream of hydrogen, silicon and carbon is directed onto the body in a direction substantially parallel to the axis of rotation.

---

This application is a division of application Ser. No. 343,267, now Patent No. 3,250,322, filed Feb. 2, 1964.

This invention relates to heat exchangers, and more particularly, but not by way of limitation, relates to an improved heat exchange element and assembly for handling an oxidizing or otherwise corrosive fluid, and further relates to an improved system and process for manufacturing the heat exchange elements.

It is desirable in many commercial processes to transfer thermal energy between a noncorrosive fluid and an oxidizing or otherwise corrosive fluid. For example, processes utilizing hydrochloric acid, nitric acid, various chrome plating solutions, molten materials and the like may often be performed more economically by the use of a heat exchanger provided the heat exchanger has an economical operating life and can handle the corrosive fluid without contaminating the fluid. Heat exchangers having various corrosion resisting elements such as glass and tantalum have been proposed for these applications but are not wholly satisfactory for various reasons. Graphite elements have been employed for some corrosive fluid applications, but are generally unsuitable under oxidation conditions such as described above.

The present invention contemplates a heat exchange element for use in oxidizing and other corrosive environments which is comprised of a body forming a fluid passageway for the corrosive fluid having walls which are coated by a uniform layer of fluid-impervious material which is predominantly beta silicon carbide. In particular, the invention contemplates a heat exchange element comprised of graphite having a thermal coefficient of expansion approximately matching the thermal coefficient of expansion of the impervious layer of predominantly silicon carbide such that the element may be used over a wide range of temperatures without rupturing the fluid-tight silicon carbide layer. More specifically, the graphite body has a coefficient of thermal expansion of about $4.0 \times 10^{-6}$ to $5.4 \times 10^{-6}$ in./in./° C.

The present invention also contemplates a novel process for manufacturing the heat exchange elements and similar articles comprised of the steps of rotating the element in a chamber, heating the element, and introducing a hydrogen stream containing silicon and carbon into the chamber in such a manner that the process stream will pass over the surface of the article at a relatively high rate to increase the rate of deposition and thereby form a bulk coating on the surface of the article which is predominately silicon carbide and is essentially fluid-impervious silicon carbide which may have traces of free silicon or carbon as a second phase. The coatings are impervious to $H_2$ at temperatures as high as 1500° C.

In accordance with a more specific aspect of the invention, the hydrogen stream is introduced in such a manner as to pass through the fluid passageways in the article as the article is rotated and heated. Another specific aspect of the invention entails heating the element by radiant energy and rotating the element so as to attain uniform heating and a uniform coating of silicon carbide.

The present invention further contemplates a novel system for carrying out the process comprised generally of a reaction chamber, support means for rotating the substrate body, heating means for heating the body as it is rotated, and nozzle means for introducing a process stream into the reaction chamber so as to impinge upon the substrate and pass through the bores, if any, through the substrate. In accordance with more specific aspects of the invention, the substrate is heated by a radiant energy source disposed below the substrate and a portion of the process stream is introduced below the substrate body such that thermal convection currents will tend to circulate the process stream within the reaction chamber.

Therefore, an important object of the present invention is to provide a heat exchange element which will handle oxidizing and other corrosive fluids without deleterious effects on the element.

Another object of the invention is to provide a heat exchange element of the type described which will also have an extremely hard surface and which may therefore be used to handle highly abrasive fluids.

Yet another object of the present invention is to provide a heat exchange element of the type described having good thermal conductivity.

Still another object of the present invention is to provide a heat exchange element of the type described which may be used over a wide temperature range.

A still further object of the present invention is to provide a heat exchange assembly for handling fluids which tend to oxizide or otherwise corrode graphite and most metals.

Another object of this invention is to provide a system and process for manufacturing a heat exchange element of the type described or similar article of manufacture having a fluid-impervious coat of essentially silicon carbide.

Still another object of the invention is to provide a system and process of the type described which produces a uniformly coated article.

Yet another object of the present invention is to provide a process of the type described which may be used to apply a coat of silicon carbide to an article of considerable size and having a multitude of small bores or other odd shape.

Many additionl objects and advantages of this invention will be evident to those skilled in the art from the following detailed description and drawings, wherein.

Figure 1:
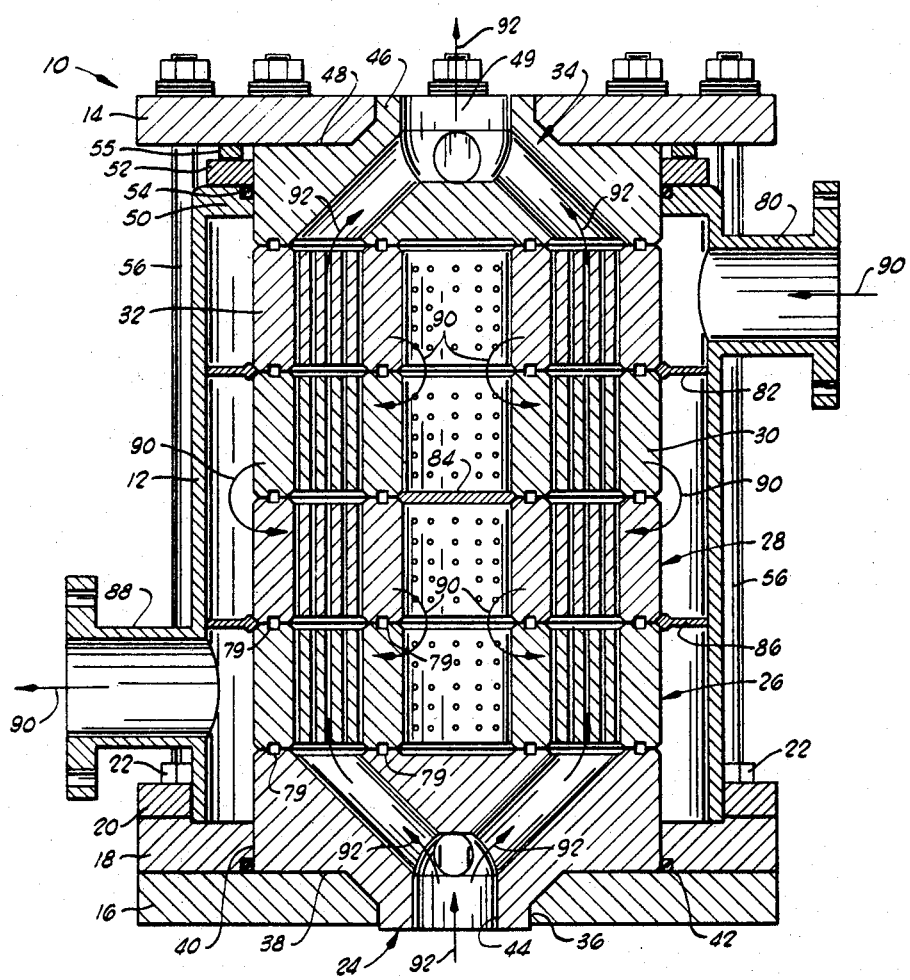
FIGURE 1 is a somewhat schematic sectional view of a heat exchanger, constructed in accordance with the present invention.

Referring now to the drawings, an exemplary heat exchange assembly employing heat exchange elements coated in accordance with the present invention is indicated generally by the reference numeral 10. The exemplary heat exchanger 10 illustrated in FIGURE 1 is of the type described in its various aspects in U.S. Patents Nos. 2,721,730 and 2,821,369. A brief description of this exemplary heat exchanger follows. The heat exchanger comprises a metal cylindrical shell 12, the upper and lower ends of which are covered generally by the plates 14 and 16, respectively. The lower end of the cylindrical shell 12 rests on an annular flange 18 and is received within a second annular flange 20. The lower plate 16 and the annular flanges 18 and 20 are fastened together by bolts 22.

A plurality of elements 24, 26, 28, 30, 32 and 34 constructed in accordance with the present invention are stacked within the shell 12. Each of the elements is preferably fabricated of graphite and is coated with fluid-impervious silicon carbide of the type hereafter described in greater detail for protecting the elements and the assembly from oxidation or otherwise corrosive action. The lower header element 24 has a necked portion 36 which is received within an aperture in the lower plate 16 and a downward-facing annular shoulder 38 which rests on the upper face of the plate 16. The header element 24 also has a diameter 40 which is closely received within the annular flange 18. A suitable seal 42 is provided at the junction between the lower header member 24, the lower plate 16 and the annular flange 18. A multichannel fluid passageway 44 extends through the header element 24.

The heat exchange elements 26, 28, 30, and 32 are doughnut-shaped and are stacked upon the lower header element 24 and will hereafter be described in greater detail. The upper header element 34 is substantially identical to the lower header element 24 and is stacked on the uppermost heat exchange element 32. The header element 34 has a neck portion 46, which is received within an aperture in the upper plate 14, and an annular shoulder 48 which abuts against the lower face of the plate 14. A multichannel fluid passageway 49 extends through the header element 34. The periphery of the header element 34 is received within an inwardly projecting annular flange 50 formed at the upper end of the cylindrical shell 12 and within an annular washer 52. An annular O-ring seal 54 is clamped between the washer 52 and the flange 50 to provide a peripheral seal around the header element 34. An annular spacer 55 is disposed between the washer 52 and the plate 14. A plurality of bolts 56 extend through suitable apertures in the upper plate 14 and are connected to the lower annular flange 20 so as to clamp the stack of elements including the header element 34, the heat exchange elements 26, 28, 30, and 32, and the lower header element 24 tightly together.

Figure 2:
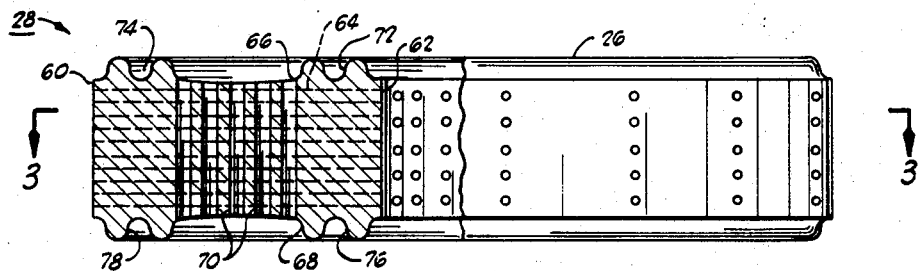
FIGURE 2 is a side view, partially in section, of a heat exchange element of the device of FIGURE 1.
Figure 3:
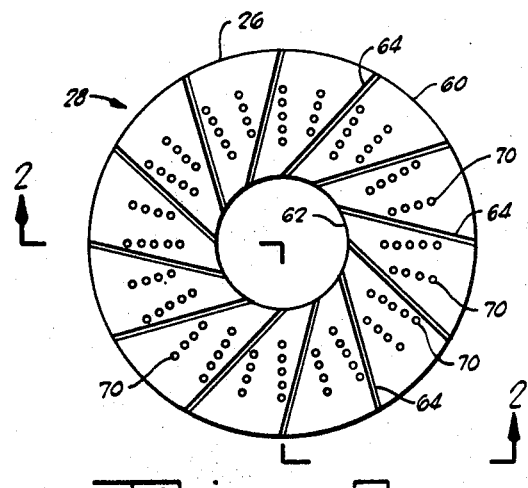
FIGURE 3 is a sectional view taken substantially on lines 3—3 of FIGURE 2.

The heat exchange elements 26, 28, 30, and 32 are of identical construction and each is comprised of a doughnut-shaped body of heat exchange material substantially as shown in FIGURES 2 and 3. Specifically, the heat exchange element 26 is illustrated in FIGURES 2 and 3 and has an outer annular wall 60 and an inner annular wall 62. A plurality of generally radial bores 64 extending between and intersecting the inner and outer walls 60 and 62 to provide for fluid communication therebetween. The element 26 also has upper and lower faces 66 and 68. A plurality of axial bores 70 provide fluid communication between the upper and lower faces 66 and 68 but do not intersect the radial bores 64. The center portions of the upper and lower faces 66 and 68 are preferably concave, substantially as illustrated in FIGURE 2. The upper face 66 is bounded by inner and outer annular gasket grooves 72 and 74, and the lower face 68 is bounded by inner and outer gasket grooves 76 and 78. When the elements 26, 28, 30, and 32 and the header elements 24 and 34 are stacked in the heat exchange assembly 10, the annular grooves of the abutting elements mate to form annular cavities which receive Teflon (a trademark of E. I. du Pont de Nemours & Co. for a tetrafluoroethylene polymer) or other suitable sealing rings 79 as can be seen in FIGURE 1. For high temperature application ground joint seals between elements may be substituted for the sealing rings.

In the operation of the device, the corrosive fluid enters through a multichannel passageway 44 in the lower header 24, for example, and passes through the bores 70 of the successive heat exchange elements 26, 28, 30, and 32, then exits through the multichannel passageway 49 in the upper header 34, substantially as indicated by the arrow 90. The annular spaces formed between the adjacent heat exchange elements by the concave faces 66 and 68 form mixing chambers which assist in agitating the fluid and promoting heat exchange. The Teflon sealing rings 79 in the annular grooves restrict the corrosive fluid to the upper and lower faces of the heat exchange elements and to the axial bores 70.

The other fluid enters the shell 12 through a flanged conduit 80. An annular baffle 82 is provided between the heat exchange elements 30 and 32 to insure that the incoming fluid passes radially inwardly through the radial bores 64 into the interior of the heat exchange element 32. A disc-shaped baffle 84 is disposed between the heat exchange elements 28 and 30 to direct the fluid outwardly through the radial bores 64 of the heat exchange element 30. A second annular baffle 86 is disposed between the elements 26 and 28 to direct the fluid back through the radial bores of the heat exchange element 28 into the interior of the element. Then the fluid passes radially outwardly through the bores 64 of the lowermost heat exchange element 26 and exits through the flanged conduit 88. Thus it will be noted that the fluid entering the flanged conduit 80 follows a zigzag path through the radial bores 64 of the four heat exchange elements substantially as indicated by the arrow 92.

It will be noted that the corrosive fluid is confined exclusively to the interior of the header elements 24 and 34 and the heat exchange elements 26, 28, 30, and 32. As previously mentioned, the surfaces of the header elements 24 and 34 and the surfaces of heat exchange elements 26, 28, 30, and 32 are uniformly coated with dense, fluid-impervious, beta crystalline, silicon carbide which may have traces of free silicon or free carbon atoms as hereafter described in greater detail. The silicon carbide, by reason of its chemical properties and impervious nature, protects the base material of the elements from oxidation and corrosion. The silicon carbide is also extremely hard and protects the elements from abrasive wear such as would be caused by solids entrained in the fluids. The header and heat exchange elements are preferably fabricated from graphite having a coefficient of thermal expansion in the range from about $4.0 \times 10^{-6}$ to about $5.4 \times 10^{-6}$ in./in./° C., and preferably about $4.5 \times 10^{-6}$ in./in./° C. However, in accordance with the broader aspects of the invention, the elements may be comprised of tungsten or molybdenum coated with silicon carbide.

Figure 4:
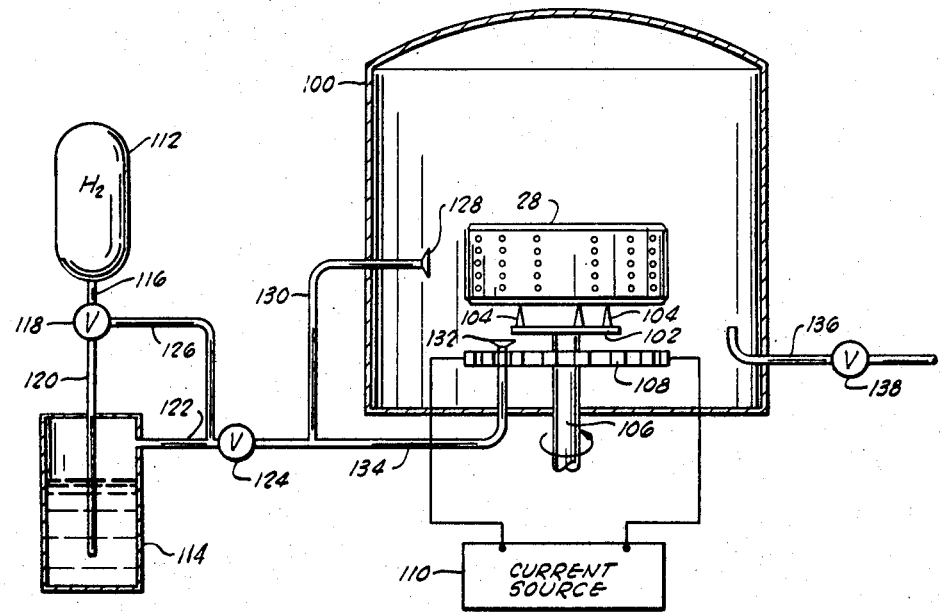
FIGURE 4 is a schematic drawing of a process system constructed in accordance with the present invention which also serves to illustrate the process of the present invention.

The fluid-impervious coat of silicon carbide may be applied to each of the elements by a process carried out in the novel system illustrated schematically in FIGURE 4. The system is comprised of a reaction chamber 100 which may be provided with suitable insulation (not illustrated) in order to efficiently and conveniently maintain a high and uniform temperature within the chamber. The chamber 100 may also be provided with some suitable access means such as a bolted flange connection between the top and bottom halves of the chamber. A suitable support means 102 comprises three relatively sharp spikes 104 and supports the graphite body of the element 28. The spikes 104 contact a minimum area of the element and space the remainder of the support means 102 away from the lower surface of the element. The support means 102 has a shaft 106 which extends through and is rotatably journaled in the bottom of the chamber 100. A suitable drive is connected to the shaft 106 for rotating the shaft and therefore the element 28 about its longitudinal axis which, as illustrated, is vertically disposed.

A resistive heating element 108 is disposed beneath and axially spaced from the element 28. The resistive heating element 108 is connected to a suitable variable current source 110. The heating element 108 preferably has a generally round configuration corresponding to that of the element 28 so as to promote uniform heating of the element.

A system for injecting reactants into the chamber 100 includes a hydrogen pressure tank 112 and a materials container 114. A conduit 116 interconnects the hydrogen tank 112 and a proportioning valve 118. A second conduit 120 extends from the valve 118 to a point within the materials container 114. The end of the conduit 120 within the container 114 extends below the surface of the liquid in the container so as to bubble the hydrogen through the material and entrain vapors of the material in the hydrogen. A conduit 122 extends from the container 114 to a second valve 124. A bypass conduit 126 extends from the proportioning valve 118 to the conduit 122. A pair of fan shaped nozzles 128 and 132 are connected to valve 124 by conduits 130 and 134, respectively. The location of the nozzles 128 and 132 is an important aspect of the present invention. The nozzle 128 is so positioned as to direct the process stream into the adjacent radial bores 64 of the element 28 as the element is rotated about its longitudinal axis as hereafter described in greater detail. The nozzle 132, on the other hand, is so positioned as to direct the process stream through the axial bores 70 of the element 28 then adjacent the nozzle. Additional nozzles may be provided as desired to direct the process stream across the surface of the substrate body. An exhaust conduit 136 having a valve 138 removes the process stream from the chamber 100.

The process of the present invention is an improvement over the process described in U.S. application S.N. 68,767, now abandoned, entitled "Novel Vapor Deposition Process and Product," filed by William A. Santini, Jr., on Nov. 14, 1960. In the present process, a gaseous stream containing hydrogen, silicon and carbon in an appropriate ratio is introduced into the reaction zone in which is located a heated substrate. The carrier gas of the process stream is hydrogen and the flow conditions and geometry of the reaction zone are chosen with reference to the heated substrate such that the process stream flows about the heated substrate to form a minimum thickness quiescent zone through which a relatively high rate of diffusion occurs to produce the rapid codeposition of silicon and carbon atoms onto the surface of the heated substrate. The proportion of atoms of silicon and carbon that are deposited can be controlled to yield a material which is substantially stoichiometric silicon carbide or may be silicon carbide having either carbon or silicon atoms as a second phase. The process provides a diffusion controlled, surface catalyzed reaction in which molecules of the reactants move across the thin quiescent zone existing adjacent the surface of the heated substrate by virtue of a relatively high diffusion gradient. The molecules, upon reaching the surface of the substrate, are degraded to yield free silicon and carbon atoms which subsequently react to form a coat of silicon carbide. In the reaction, hydrogen favors the formation of silicon atoms and this can be employed to control the proportion of silicon and carbon atoms formed.

In accordance with a specific aspect of the invention, methyltrichlorosilane is used to supply the silicon and carbon atoms in the hydrogen carrier gas and form the process stream. The heating element 108 is resistively heated by current from the source 110. The heat exchange element 28 is then rotated by the drive means connected to the shaft 106 at a relatively slow rate of from about 0.5 to 10 r.p.m. As the heat exchange element 28 is rotated, it is uniformly heated by radiant energy from the heating element 108 to a temperature of from about 900° C. to about 1500° C. A suitable heat sensing means such as an optical pyrometer (not illustrated) may be used to determine the temperature of the substrate heat exchange element 28 and automatically control the current to the heating element to maintain a preset temperature.

After the heat exchange element 28 has been uniformly heated to the desired temperature, some hydrogen from the pressure tank 112 is passed through the proportioning valve 118 into the container 114 where methyltrichlorosilane vapor is entrained in the hydrogen. The hydrogen-methyltrichlorosilane vapors then pass through the conduit 122 and are reunited before the valve 124 with pure hydrogen bypassed through the conduit 126 by the proportioning valve 118. Thus the valve 118 provides a means for controlling the ratio of hydrogen to methyltrichlorosilane in the process stream. The mol ratio of the hydrogen to the methyltrichlorosilane should be from about 50:1 to about 4:1. The ratios between the hydrogen and methyltrichlorosilane may be determined by a thermal conductivity cell. The flow rate of the process stream may be monitored by suitable flow meters and controlled by the valve 124. As the process stream leaves the valve 124, it is divided and passes through the nozzles 128 and 132 and is directed into the reaction chamber 100 onto the hot heat exchange element 28. The process stream injected from the nozzle 128 tends to pass through the radial bores 64 of the element 28 as the element is rotated and the bores become generally aligned with the nozzle. Similarly, the process stream of the nozzle 132 is directed through the axial bores 70 of the element 28 as the element is rotated and the respective bores become generally aligned with the nozzle. The process materials are exhausted through the conduit 136 and the valve 138.

It will be noted that the rotation of the element 28 is necessary in order to assure that the exchange element 28 is evenly heated by radiant energy from the element 108 and also to insure that the process stream penetrates the generally radial bores 64 and the axial bores 70 uniformly around the periphery of the annular body of the heat exchange element. The rotation feature is particularly advantageous when the bores 64 and 70 are of relatively small diameter. For example a heat exchange element with bores 64 and 70 as small as ¼″ in diameter has successfully been coated with silicon carbide in accordance with this invention. Thus as each set of bores passes the respective nozzles, the process stream is caused to flow through the bores. As the process stream passes through the bores, a relatively high flow velocity should be established (by employing a suitable feed rate) to insure that the quiescent zone is relatively thin and that the diffusion rate is relatively high so that the carbon and silicon atoms will be deposited on the surface at a sufficiently high rate to prevent the formation of large crystals and produce a dense bulk coat of beta silicon carbide which is essentially fluid-impervious. As the bores rotate away from the nozzle, the process fluids tend to be stagnant within the bores such that little deposition takes place. As the process is carried out, a substantially uniform coat of silicon carbide is formed over the entire surface of the heat exchange element 28 including the interior surfaces of the radial bores 64 and the axial bores 70. The silicon carbide coat is formed by the mechanism previously explained in which the methyltrichlorosilane is decomposed to produce free atoms of silicon and carbon at the surface of the element 28 by virtue of a diffusion controlled, surface catalyzed reaction.

In order to afford a better understanding of the silicon carbide coating, specific properties of silicon carbide coatings produced by the present process will now be presented. A relatively wide range of process variables including the mol ratios, process stream flow rate and therefore flow velocities, temperature of the substrate, and duration of the run will vary the thickness and physical and chemical properties of the silicon carbide coat within the following ranges. Runs have been conducted using hydrogen flow rates of 20 liters per minute to 100 liters per minute depending upon the system. Duration of the runs have been varied from 0.05 to 8.7 hours at temperatures from 1180° C. to 1450° C. Silicon carbide coatings having thicknesses from 3 to 115 mils have been produced. The silicon carbide coatings have beta crystalline structure, are very dense and, most important of all, are essentially fluid-impervious. The silicon carbide coatings have ranged from stoichiometrically pure silicon carbide to silicon carbide having as much as 0.89% free carbon or as much as 36.5% free silicon as a second phase element, depending upon the excess materials present and the amount. The compressive strength of the materials produced by the process ranges from about $31 \times 10^3$ to about $55 \times 10^3$ p.s.i. The modulus of elasticity ranges from about $45 \times 10^6$ to about $50 \times 10^6$ p.s.i. The coefficient of thermal expansion ranges from about $4.0 \times 10^{-6}$ to about $5.4 \times 10^{-6}$ in./in./° C. when tested in the temperature range of 30° to 810° C. The Knoop hardness of the material determined by utilizing a 1000 gram load and ranges from about 988 to about 2900. The resistivity of the material ranges from 0.005 to about 4 ohm-centimeters. The density determined on a water displacement basis and ranges from 2.59 to 3.28 grams per cc. The material was checked for thermal shock and no appreciable adverse effect resulted when material at 1000° C. was plunged into water at room temperature.

Although methyltrichlorosilane was specified in the above described example, it will be appreciated that various other materials can be employed to furnish the silicon and carbon without departing from the teachings of the invention. For example, the silicon carbide source may be single compounds, such as dimethyldichlorosilane, trimethylchlorosilane, tetramethylsilane and other aliphatic and aromatic substituted halogenated silanes. Also, the silicon atoms and carbon atoms may be supplied in separate compounds. For example, the carbon atoms may be supplied by compounds such as methane, ethane, propane, benzene, toluene, xylene, ethylene, propylene, and other aliphatic and aromatic hydrocarbons, and the silicon atoms may be supplied by compounds, for example, such as silicon tetrachloride, silicon tetrabromide, silicon tetraiodide, or any one or more of mono-, di-, and tri-, chloro-, bromo-, and iodosilane.

From the above detailed description of preferred embodiments of the present invention, it will be evident that a novel heat exchange element, a novel process for manufacturing the heat exchange element, and a novel system for carrying out the process have been described. The heat exchange element is highly resistant to oxidation and other corrosive fluids because of the chemical properties of silicon carbide, has good thermal conductivity due to the thermal properties of graphite and the silicon carbide, can be utilized at very high temperatures in high thermal gradients for maximum efficiency due to the stability of the silicon carbide at high temperature and the substantially matching coefficients of thermal expansion of the graphite and silicon carbide. The silicon carbide coat is extremely hard so that the heat exchange element may be used under severe abrasive conditions and still have a long service life.

The novel process and novel system for carrying out the process insure that the relatively large heat exchange element will be uniformly heated and that the process stream will uniformly enter the multitude of small bores, thereby insuring that the body of substrate material is uniformly coated with silicon carbide. Due to the fact that the process stream is impinged directly upon the surface of the substrate and passed through the bores at a considerable velocity, the quiescent zone necessarily established adjacent the surface is reduced in thickness such that diffusion of the carbon and silicon atoms to the surface occurs at a relatively high rate due to the concentration gradient across the quiescent zone. Further, the rapidly flowing process stream constantly makes additional carbon and silicon atoms available so that a dense bulk coat of fluid-imprevious silicon carbide is formed over that portion of the surface exposed to the stream. The process stream nozzles are located so as to pass the process stream over substantially the entire surface of the substrate body at one time or another as the relatively large substrate body is rotated. Advantageously the process of this invention is particularly suited for (though not limited to) commercial operation at pressures between atmospheric pressure and about 5 p.s.i.g. thereby avoiding the necessity for complex and expensive gas exhausting equipment and the concomitant safety hazards normally associated with operating hydrogen at reduced pressures.

Although several preferred embodiments of the invention have been described in detail, it is to be understood that various changes, substitutions and alterations can be made therein without departing from the spirit and scope of the invention as defined by the appended claims.

What is claimed is:

1. A process for manufacturing a heat exchange element comprised of an annular body of graphite having a plurality of circumferentially spaced, generally radially extending bores and a plurality of circumferentially spaced, axially extending bores covered by an essentially silicon carbide fluid-impervious coat comprising the steps of:

rotating the annular body of graphite about the longitudinal axis within a reaction chamber, heating the annular body by an energy source disposed externally of the body as the body is rotated to uniformly heat the body, and directing a first stream of hydrogen, silicon and carbon onto the body in a direction substantially perpendicular to the axis of rotation so that the process stream will pass through each of the radially extending bores as the body is rotated past the nozzle means and directing a second stream of hydrogen, silicon and carbon onto said body in a direction substantially parallel to the axis of rotation so that the process stream will pass through the axially extending bores as the body is rotated past the second nozzle means, whereby a surface catalyzed reaction between the silicon and carbon will take place to form said essentially silicon carbide fluid impervious coat.

2. A process for manufacturing a heat exchange element comprising the steps defined in claim 1 wherein:

the annular body is heated by radiant energy from a source axially spaced from the body.

References Cited

UNITED STATES PATENTS

| 2,721,730 | 10/1955 | Clause et al. | 165—88 |
| 2,812,272 | 11/1957 | Nack et al. | 118—48 X |
| 2,011,877 | 11/1961 | Schweickert et al. | 117—106 |
| 3,011,912 | 12/1961 | Gareis et al. | 117—106 |
| 3,066,044 | 11/1962 | Samuel | 117—107.2 |
| 3,120,451 | 2/1964 | Schmidt | 117—106 |
| 3,157,541 | 11/1964 | Heyway et al. | 117—106 |
| 3,190,262 | 6/1965 | Bukish et al. | 118—48 |
| 3,233,578 | 2/1966 | Capita | 117—106 |

FOREIGN PATENTS 362,020  12/1931  Great Britain.

RALPH S. KENDALL, *Primary Examiner.*

ALFRED L. LEAVITT, *Examiner.*